United States Patent [19]
Barin

[11] Patent Number: 6,142,878
[45] Date of Patent: Nov. 7, 2000

[54] FLEXIBLE COUPLING WITH ELASTOMERIC BELT

[76] Inventor: Jose Florian B. Barin, 304 Orchard La., Bloomingdale, Ill. 60108

[21] Appl. No.: 09/197,781

[22] Filed: Nov. 23, 1998

[51] Int. Cl.[7] .................................................. F16D 3/52
[52] U.S. Cl. ............................ 464/88; 464/149; 464/901
[58] Field of Search .................... 464/73, 74, 75, 464/87, 88, 149, 150, 155, 154, 173, 901

[56] References Cited

U.S. PATENT DOCUMENTS 3,362,191  1/1968  Louette ..................................... 464/88
5,139,460  8/1992  Hoyt, III et al. .
5,295,911  3/1994  Hoyt, III et al. .
5,657,525  8/1997  Hoyte, III et al. ........................ 464/88

Primary Examiner—Anthony Knight
Assistant Examiner—Kenneth Thompson
Attorney, Agent, or Firm—Knechtel, Demeur & Samlan

[57] ABSTRACT

A flexible shaft coupling device having two hubs with teeth extending from each hub toward the other hub. The teeth are in parallel alignment and spaced from each other. There are projections on a flexible elastomeric belt which fill the gaps between adjacent pairs of teeth. The projections are connected by a flexible pleated connector to absorb start-up forces and increase the life of the belt. A retainer band is mounted around the belt to keep the belt securely in place.

17 Claims, 2 Drawing Sheets

FLEXIBLE COUPLING WITH ELASTOMERIC BELT

BACKGROUND AND SUMMARY OF THE INVENTION

This invention relates to couplings used for transmitting rotation from one shaft to another, and more particularly, to a coupling using an elastomeric belt with a retaining sleeve used to keep the belt in place.

Various types of flexible couplings have been used for connecting one shaft to another. These couplings compensate for relatively minor degrees of shaft misalignment which are normally encountered in manufacturing operations.

One type of prior art coupling uses two hubs, each hub having a plurality of projecting teeth extending from the hub face toward the other hub face. Such couplings, called jaw-type couplings, are sold by Lovejoy, Inc. of Downers Grove, Ill. The hubs are each mounted on one of the shafts. The teeth extending from each hub face are of a length so that they will be slightly separated from the other hub face when the coupling is assembled. The teeth, which are parallel to but overlap each other, are separated by spaces. An elastomeric element, often called a spider, occupies the plurality of spaces formed between adjacent teeth. Thus, the force from the teeth of the one hub is transmitted through the elastomeric element to the teeth of the other hub. These couplings operate with the elastomeric element in compression and have the characteristics of compactness, capable of transmitting large forces and continuing to transmit rotational forces even when the elastomeric element fails. This last characteristic can be an advantage or a shortcoming in that if the elastomeric element fails, the teeth of one hub strike the teeth of the other hub and continue to drive the driven shaft and any equipment to which it is connected. Thus, in an overload condition, the driven equipment is not protected by the coupling.

Another type of flexible coupling is illustrated in U.S. Pat. No. 5,139,460 by Hoyt, III et al. This coupling is similar to the above described coupling in that a pair of hubs each having extending teeth are mounted on their respective shafts. However, the teeth on one hub are parallel to and aligned with the teeth on the other hub. A belt surrounds the hubs and fills in the spaces between adjacent pairs of teeth. Projections on the belt engage receptacles on the hub teeth to prevent the hubs from moving apart. In this design, the belt operates in shear.

Advantages of this type of design are that the belt provides for misalignment between the shafts; the belt transmits power uniformly; the belt provides damping; and if the belt fails, the driven equipment is protected as it will essentially be disconnected from the drive shaft. Furthermore, this type of design allows the belt to be replaced without disassembling the hubs or moving the equipment connected to the shafts.

Another type of shear coupling is illustrated in U.S. Pat. No. 5,295,911 to Hoyt, III et al. This design illustrates teeth overlapping each other while using an elastomeric belt between overlapping teeth to transmit the torque. There is also shown a retainer ring surrounding the belt to keep the belt in place.

A problem arises with this coupling in that the elastomeric belts are subject to large and continuous forces during operation. Upon starting and stopping, the shear and compression forces on the elastomeric belt are further increased. The area on the belt between adjacent load transmitting projections is thinner and thus more prone to failure. Thus, there is a need to provide an elastomeric belt which has a longer life than previously used belts in shear couplings.

Another problem with prior couplings operated in shear which use an elastomeric belt is that the configuration and geometry of the hub teeth make it difficult to install and remove the elastomeric belt. Previously, the hub teeth on such shear couplings had the sides of the teeth parallel to each other. The hub teeth were rectangular in cross section. This made it difficult to insert and remove the projections on the elastomeric belt. There was a need for a belt and hub tooth design which made it easier to install and remove the belt from the hub.

Accordingly, it is an object of the invention to provide a flexible coupling which operates in shear and utilizes an elastomeric belt which has a longer life than prior belts. Related to this object is the object of providing an elastomeric belt which has a flexible pleated portion to absorb start-up forces, thereby extending the life of the belt.

It is a related object to provide a shear type flexible coupling which has an elastomeric belt having projections thereon which are received between the hub teeth in such a manner as to allow easy installation and removal from the teeth.

The invention disclosed herein provides a shear-type flexible coupling in which the teeth on the hubs are in parallel alignment and spaced from each other. A flexible elastomeric belt fills the gaps between adjacent pairs of teeth. A retainer band is mounted around the belt to keep the belt securely in place. The elastomeric belt has pleated portions which flex and absorb the start-up forces when the drive shaft begins rotating. The projections on the belt are wedge shaped to engage wedge shaped teeth on the hubs. This allows the belt to be more easily installed and removed than on prior shear type couplings.

DETAILED DESCRIPTION OF THE PREFERRED EMBODIMENT

Figure 1:
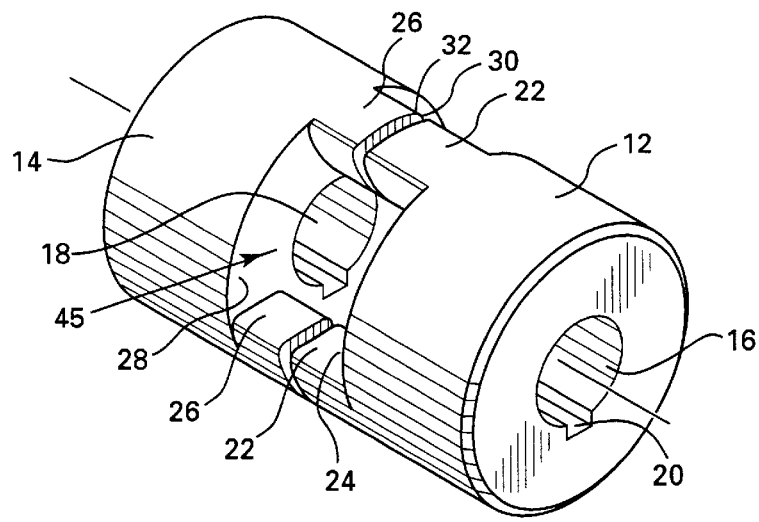
FIG. 1 is a perspective view of two hubs used in a flexible coupling of the present invention.

Turning first to FIG. 1 there is illustrated a pair of hubs used in a unique flexible coupling 10. The coupling 10 connects two aligned shafts (not illustrated),one normally a drive shaft and the other, a driven shaft. The coupling is comprised of a first cylindrical hub 12 and a second cylindrical hub 14 which are substantially identical to each other. Each cylindrical hub has a central bore 16, 18 which is adapted to receive its respective shaft. The bores 16 and 18 can be of different diameters. It is only necessary that they be the proper size to receive the shaft to which it is to be fastened. The hubs 12 and 14 are secured to the shafts by conventional means such as a keyway 20. However, other conventional manners of affixing the hubs to the shaft can be used such as a set screw or other such similar means.

When the hubs 12 and 14 are mounted to their respective shafts, they are in substantially axial alignment as shown in FIG. 1. A first set of teeth 22 are located on the first face 24 of the hub 12. The cylindrical hub 14 has a second set of teeth 26 projecting from a second face 28. The first teeth 22 terminate at ends 30 and the second teeth 26 terminate at ends 32. The teeth 22 and 26 and their respective ends 30 and 32 are axially aligned with each other when the hubs are assembled to their respective shafts. However, they will normally be spaced a short distance from each other so that there is no metal to metal contact between the ends 30 and 32.

When assembled, the sides of the teeth 22 and 26 lie in the same plane as seen in FIG. 1. The teeth 22 and 26 are not rectangular or square when viewed from their ends. Rather, they are wedge shaped with their exterior edge nearer the outer circumference of the hub 12 or 14 being greater than the interior edge nearer the bores 16 or 18.

Figure 2:
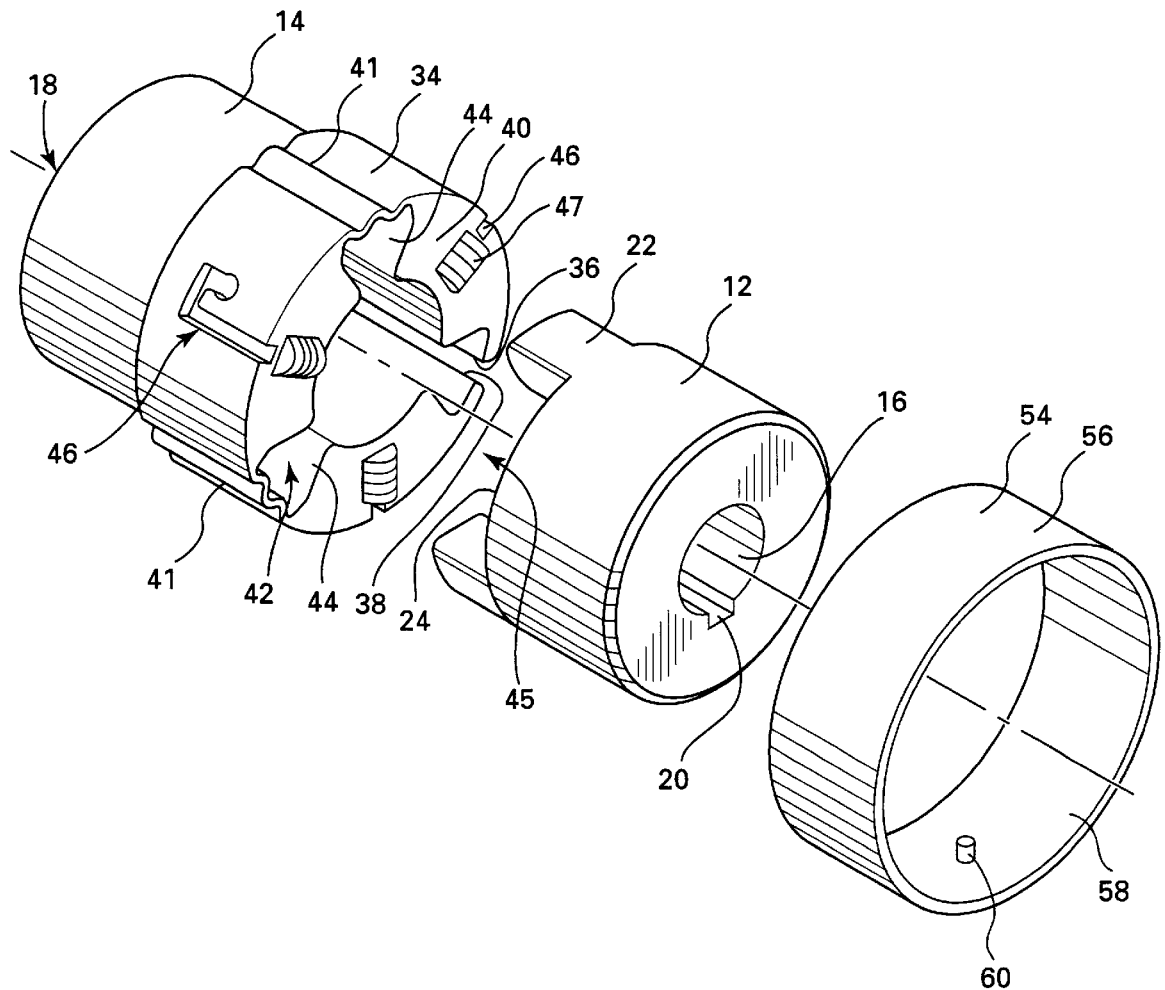
FIG. 2 is an exploded perspective view of the flexible coupling of the present invention.

In FIG. 2 there is illustrated an elastomeric belt 34 which transmits power from the drive shaft to the driven shaft. The elastomeric belt 34 is usually made of rubber, synthetic rubber, plastic material, or polyurethane. The particular material chosen depends upon the size, load, resistance to oils and chemicals, and temperature for a given application. The belt 34 terminates at split ends 36 and 38. Along the interior of the belt 34 are a plurality of wedge shaped projections 40. The projections 40 are separated by openings 42 defined by side walls 44 of the projections 40.

Figure 3:
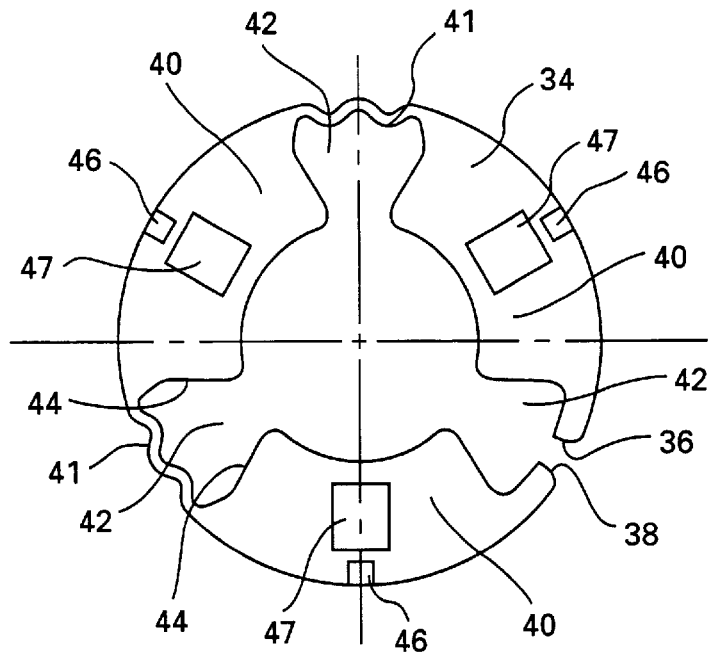
FIG. 3 is an end view of the elastomeric belt used in the inventive coupling.
Figure 4:
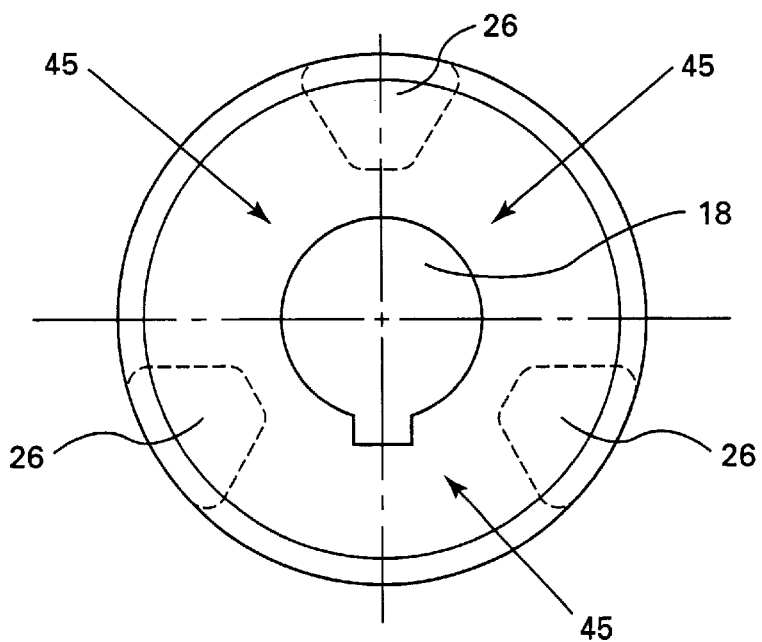
FIG. 4 is an end view of a hub looking along the shaft and illustrating the wedge shape of the hub teeth.

Except for where the split ends 36, 38 join together in butting relationship, the projections 40 are connected to adjacent projections 40 by means of a bridging piece or bridging member 41. The bridging piece 41 is preferably made of the same material as the elastomeric belt 34 and is formed integrally with the belt 34. The bridging piece 41 has a pleated or serpentine configuration when viewed in cross-section as seen in FIG. 3.

The purpose of the pleating is to act as a shock absorber when the drive shaft starts up and begins transmitting torque to the driven shaft. The pleating flexes when the initial start-up torque is applied and dissipates the shock force. This results in increased life of the elastomeric belt 34 and less shock applied to the driven load. Although a pleated configuration is illustrated, other flexible, shock absorbing designs are available. For example, flexible strips of the same or different material can be interposed for the bridging piece 41. Alternatively, a softer material than that of which the projections 40 are made can be used. The main objective is to use a flexible, shock absorbing material as the bridging piece 41.

The number of projections 40 equals the number of teeth on the hubs 12 or 14. The wedge shaped projections 40 are dimensioned to be closely received in gaps 45 formed between adjacent pairs of aligned teeth. The teeth 22 and 26 are dimensioned to be closely received within the openings 42 in the elastomeric belt 34. Thus, a close frictional fit is realized between the teeth 22 and 26 and openings 42 with the wedge shaped projections 40 closely received within the gaps 45. After assembly, the sides of the projections 40 lie in a planar surface closely adjacent to and parallel to the plane of the sides of the teeth 22 and 26. The elastomeric belt 34, when it is properly installed on the teeth 22 and 26, retains the respective teeth in substantially axial alignment with each other. Furthermore, the elastomeric belt 34 serves to transmit the torque from the drive shaft to the driven shaft in the manner intended. The elastomeric belt accommodates slight misalignment of the shafts without causing undue stress within the belt itself.

The belt 34 is easily wrapped around the hubs 12 and 14 when the hubs are mounted to their respective shafts. In this manner, the ends 36, 38 are spread apart such that the belt 34 is positioned with the projections 40 within their respective gaps 45. The teeth 22, 26 are received within the openings 42. The ends 36, 38 will remain slightly spaced from each other when the elastomeric belt is completely assembled to the hubs 12 and 14. Nubs 47 on the faces of the belt 34 keep the teeth ends 30, 32 apart. This avoids metal to metal contact between the ends 30 to 32.

A metal collar 54 maintains the belt 34 in a locked position. The metal collar 54 has an outside surface 56 and an inside surface 58. The inside surface 58 of the collar 54 is shaped and dimensioned so that the collar 54 is slid axially relative to the hubs 12 and 14 during assembly and disassembly of the coupling 10 so that the metal collar 54 fits very snugly around the belt 34.

The elastomeric coupling 10 allows the elastomeric belt 34 to be replaced without requiring the disassembly or removal of the cylindrical hubs 12 or 14. All that is required is that the metal collar 54 be removed in the reverse sequence of events used for mounting it and then sliding it off the elastomeric belt 34. The ends 36 and 38 are spread apart from each other and the belt 34 pulled off from the first and second teeth 22 and 26. A new belt 34 is installed and the metal collar 54 slid back over the belt 34. There may also be locating pins 60 on the inside surface 58 that are received in a groove 46 cut into the exterior surface of the belt 34. This assists in positioning and locking the collar 54 in place.

Thus, while there has been provided a flexible coupling that has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A shaft coupling comprising:

first and second hubs, each having respective first and second faces;

first and second pluralities of teeth extending from the respective first and second faces, the teeth on the first face in parallel alignments with the teeth on the second face, the aligned teeth forming gaps between adjacent pairs of aligned teeth;

a split, flexible belt having opposed edges and an inside and an outside surface, a plurality of spaced projections on the inside surface, each of the projections occupying one of the gaps between adjacent pairs of aligned teeth, connecting means comprising a bridging member having a pleated cross-sectional configuration for connecting at least two of the spaced projections to each other, the connecting means having a flexible portion for absorbing impact forces transmitted between the first and second hubs, and an endless retainer band adapted for mounting around the belt to retain the belt in a securely wrapped condition around the teeth.

2. The shaft coupling of claim 1 wherein the number of teeth on the first face are equal to the number of teeth on the second face.

3. The shaft coupling of claim 2 wherein the flexible belt has a width such that the teeth on the first face do not contact the teeth on the second face.

4. The shaft coupling of claim 1 wherein the teeth and projections are wedge shaped and the teeth and projections have sides whereby the sides of a pair of teeth form a planar surface which is adjacent and parallel to the sides of the projection.

5. The shaft coupling of claim 1 wherein the connecting means comprises a bridging member integrally formed with and made of the same material as the projections and belt.

6. The shaft coupling of claim 1 wherein the endless retainer band is made of metal.

7. A shaft coupling comprising:

first and second hubs, each having respective first and second faces;

first and second pluralities of teeth extending from the respective first and second faces, the teeth on the first face in parallel alignments with the teeth on the second face, the aligned teeth forming gaps between adjacent pairs of aligned teeth;

a split, flexible belt having opposed edges and an inside and an outside surface, a plurality of spaced projections on the inside surface, each of the projections occupying one of the gaps between adjacent pairs of aligned teeth, at least one connector integrally formed with and made of the same material as the flexible belt and having a serpentine cross-sectional configuration for connecting at least two of the spaced projections to each other, and an endless retainer band adapted for mounting around the belt to retain the belt in a securely wrapped condition around the teeth.

8. The shaft coupling of claim 7 wherein the number of teeth on the first face are equal to the number of teeth on the second face.

9. The shaft coupling of claim 8 wherein the flexible belt has a width such that the teeth on the first face do not contact the teeth on the second face.

10. The shaft coupling of claim 7 wherein the teeth and projections are wedge shaped and the teeth and projections have sides whereby the sides of a pair of teeth form a planar surface which is adjacent and parallel to the sides of the projection.

11. The shaft coupling of claim 7 wherein the connector comprises a plurality of flexible strips.

12. The shaft coupling of claim 7 and further comprising connectors for connecting each of the spaced projections to an adjacent spaced projection with the exception of the spaced projections which are separated by the opposed edges.

13. A shaft coupling comprising:

first and second hubs, each having respective first and second faces;

first and second pluralities of teeth extending from the respective first and second faces, the teeth on the first face in parallel alignments with the teeth on the second face, the aligned teeth forming gaps between adjacent pairs of aligned teeth;

a split, flexible belt having opposed edges and an inside and an outside surface, a plurality of spaced projections on the inside surface, each of the projections occupying one of the gaps between adjacent pairs of aligned teeth, connecting means comprising a bridging member made of a flexible material that is different than the material than the material from which the projections are made for connecting at least two of the spaced projections to each other, the connecting means having a flexible portion for absorbing impact forces transmitted between the first and second hubs, and an endless retainer band adapted for mounting around the belt to retain the belt in a securely wrapped condition around the teeth.

14. The shaft coupling of claim 13 wherein the number of teeth on the first face are equal to the number of teeth on the second face.

15. The shaft coupling of claim 13 wherein the flexible belt has a width such that the teeth on the first face do not contact the teeth on the second face.

16. The shaft coupling of claim 13 wherein the teeth and projections are wedge shaped and the teeth and projections have sides whereby the sides of a pair of teeth form a planar surface which is adjacent and parallel to the sides of the projection.

17. The shaft coupling of claim 13 wherein the endless retainer band is made of metal.

* * * * *